J. M. DEARBORN.
ANIMAL TRAP.
No. 74,998. Patented Mar. 3, 1868.
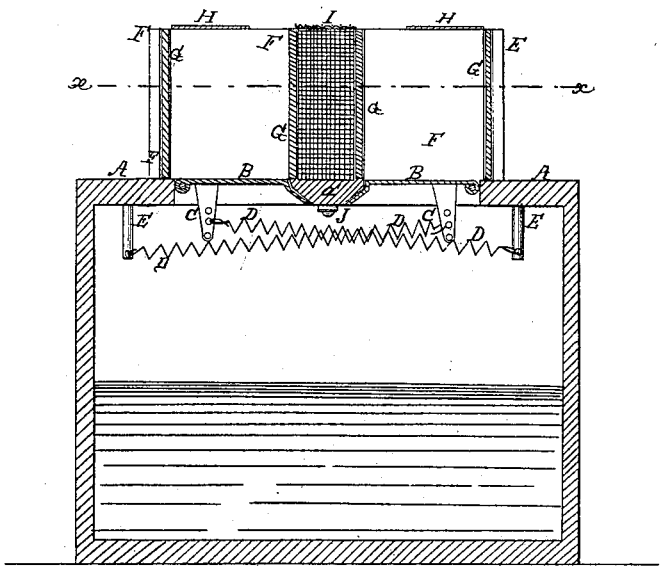
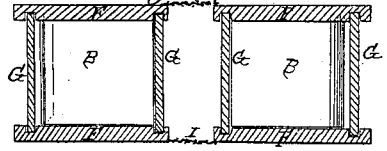

United States Patent Office.

JOHN M. DEARBORN, OF BOSTON, MASSACHUSETTS.

Letters Patent No. 74,998, dated March 3, 1868.

IMPROVED ANIMAL-TRAP.

*The Schedule referred to in these Letters Patent and making part of the same.*

TO ALL WHOM IT MAY CONCERN:

Be it known that I, JOHN M. DEARBORN, of Boston, in the county of Suffolk, and State of Massachusetts, have invented a new and useful Improvement in Animal-Trap; and I do hereby declare that the following is a full, clear, and exact description thereof, which will enable others skilled in the art to make and use the same, reference being had to the accompanying drawings, forming part of this specification.

Figure 1 is a vertical section of my improved trap.

Figure 2 is a detail horizontal section of the same, taken through the line $x\ x$, fig. 1.

Similar letters of reference indicate corresponding parts.

My invention has for its object to furnish a simple, cheap, and effective trap for catching rats and other animals; and it consists in the construction, combination, and arrangement of the various parts, as hereinafter more fully described.

A is the cover of the trap, which may be a box, barrel, or other reservoir, capable of holding water. Through the cover A are formed two rectangular holes, of suitable size, reference being had to the kind of animals to be caught. These holes should be in a line with each other, and their side and end edges should be bevelled off, the edges of the inner ends being bevelled more than the others, as shown in fig. 1. B are drop-doors, one end of which is pivoted or hinged in the outer ends of the holes in the cover A. The other or inner ends of the drop-doors B are so formed as to fit upon and overlap the bevelled edges of the central part $a'$ of the cover A, as shown in fig. 1. To the under side of each of the drop-doors B, near its side edge, and a little in front of the hinge or pivoting-point of said door, is securely and rigidly attached a downwardly-projecting arm, C, to the lower end of which is attached one end of a coiled-wire spring, D, the other end of which is secured to the lower end of a downwardly-projecting arm, E, attached to the lower side of the cover A, in such a position that the springs D may be out of the way of the movement of the drop-doors B. To the upper side of the cover A, at the side edges of the rectangular holes formed through said cover, are securely attached the lower edges of the vertical boards or plates F, in such positions that the said lower edges of the said boards may project a little over the edges of the said holes. G are glass plates, the side edges of which enter grooves in the inner sides of the boards F, near their ends, as shown in figs. 1 and 2, thus forming a chamber or compartment over each of the drop-doors B. The outer part of the top of the chambers formed by the boards or plates F and glass plates G, is covered with a board or plate, H, leaving the inner parts of said tops open for the ingress of the animals, said openings being made larger or smaller, according to the size of animal trapped for. The sides and top of the space between the inner glass plates G are covered with metallic gauze or a fine grating, I, to form a bait or decoy-chamber, the gauze I that covers the top being hinged at one end, and secured with a hook at the other end, for convenience in putting in and taking out the bait. The springs D should have only sufficient strength to bring the drop-doors B back to a horizontal position after being depressed, and hold them there until again depressed by another animal jumping upon them. Several holes should be formed through the lower parts of the arm C, so that the springs D may be adjusted to have a greater or less leverage, as may be desired. J is a button attached to the lower side of the central part $a'$ of the cover A, between the ends of the doors B, as shown in fig. 1, and which should be of such a length as to support, when turned, the inner ends of both of said doors. If desired, only one drop-door need be made. In this case the gauze I may be extended over the space occupied by the other door; or the decoy-chamber may be made of the same size as when two drop-doors are used.

In using the trap, the button J should be turned so as to support the inner end or ends of the door or doors B. Some substance acceptable to the animals should then be placed upon the doors B, and the animals allowed to enter, eat it, and retire. After the animals have become sufficiently familiar with the trap to no longer fear it, the button J is turned back, releasing the door or doors B. Some bait that will attract the rats is then placed within the decoy-chamber, and some bait that will not slip off the doors B when depressed, is placed upon said doors B. Then, as the animal jumps down upon the doors B, through the openings at the top, the doors are depressed, and the animal drops down into the water in the barrel, box, or reservoir beneath, the springs D immediately bringing the said doors back again to a horizontal position, ready for the next animal.

I claim as new, and desire to secure by Letters Patent—

The combination of the side-boards or plates F, glass end-plates G, covering-plates H, gauze or fine grating I, pivoted or hinged drop-door or doors B, arms C, coiled springs D, and arms E, with each other and with the cover A, substantially as herein shown and described and for the purpose set forth.

JOHN M. DEARBORN.

Witnesses:
A. D. PARKER,
JOHN J. LOUD.